(12) United States Patent
Nose et al.

(10) Patent No.: US 10,837,384 B2
(45) Date of Patent: Nov. 17, 2020

(54) TEMPERATURE ESTIMATION MODULE, CONTROL APPARATUS FOR INTERNAL COMBUSTION ENGINE, AND METHOD FOR OPERATING TEMPERATURE ESTIMATION MODULE

(71) Applicant: TOYOTA JIDOSHA KABUSHIKI KAISHA, Toyota (JP)

(72) Inventors: Yuki Nose, Kasugai (JP); Yoshiyuki Shogenji, Toyota (JP); Eiji Ikuta, Oobu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 16/152,862

(22) Filed: Oct. 5, 2018

(65) Prior Publication Data

US 2019/0107068 A1    Apr. 11, 2019

(30) Foreign Application Priority Data

Oct. 11, 2017    (JP) .................................. 2017-197483

(51) Int. Cl.
*F02D 41/02*        (2006.01)
*F02D 41/14*        (2006.01)
(Continued)

(52) U.S. Cl.
CPC ......... *F02D 41/0235* (2013.01); *F01N 9/005* (2013.01); *F02D 41/008* (2013.01);
(Continued)

(58) Field of Classification Search
CPC ............... F02D 41/0235; F02D 41/008; F02D 41/1408; F02D 41/1446; F02D 41/1475;
(Continued)

(56) References Cited

U.S. PATENT DOCUMENTS 5,845,492 A * 12/1998 Isobe ........................ F01N 3/22
60/284
5,974,792 A 11/1999 Isobe
(Continued)

FOREIGN PATENT DOCUMENTS

JP        2004-218541        8/2004

*Primary Examiner* — Joseph J Dallo
*Assistant Examiner* — Yi-Kai Wang
(74) *Attorney, Agent, or Firm* — Finnegan, Henderson, Farabow, Garrett & Dunner, LLP

(57) ABSTRACT

A temperature estimation module applied to a control apparatus for an internal combustion engine is configured to execute a virtual temperature estimation process that estimates a virtual temperature, which is a temperature of an exhaust purifying device under an assumption that a dither control process is not executed, based on an operation point of the internal combustion engine during execution of the dither control process. The temperature estimation module is further configured to execute an actual temperature estimation process that estimates an actual temperature of the exhaust purifying device based on a difference between the air-fuel ratio of a rich combustion cylinder and the air-fuel ratio of a lean combustion cylinder and based on the operation point of the internal combustion engine during execution of the dither control process.

8 Claims, 7 Drawing Sheets

(51) Int. Cl.
*F02D 41/38* (2006.01)
*F02D 41/00* (2006.01)
*F01N 9/00* (2006.01)
*F02D 41/22* (2006.01)
*F01N 11/00* (2006.01)

(52) U.S. Cl.
CPC ..... *F02D 41/1408* (2013.01); *F02D 41/1446* (2013.01); *F02D 41/1475* (2013.01); *F02D 41/22* (2013.01); *F02D 41/38* (2013.01); *B60W 2510/068* (2013.01); *F01N 11/005* (2013.01); *F01N 2260/04* (2013.01); *F01N 2430/06* (2013.01); *F01N 2610/03* (2013.01); *F01N 2610/146* (2013.01); *F01N 2900/1602* (2013.01); *F02D 2041/389* (2013.01); *F02D 2200/0804* (2013.01)

(58) Field of Classification Search
CPC .... F02D 41/22; F02D 41/38; F02D 2041/389; F02D 2200/0804; F01N 9/005; F01N 11/005; F01N 2260/04; F01N 2430/06; F01N 2610/03; F01N 2610/146; F01N 2900/1602; B60W 2510/068
USPC ........................................................ 123/480
See application file for complete search history.

(56) References Cited

U.S. PATENT DOCUMENTS

| | | | |
|---|---|---|---|
| 7,047,727 B2 | 5/2006 | Tanaka et al. | |
| 2004/0230366 A1* | 11/2004 | Ueda | F01N 3/2006 701/108 |
| 2004/0250534 A1* | 12/2004 | Tanaka | F02D 41/0255 60/284 |
| 2009/0292446 A1* | 11/2009 | Tanaka | F02D 41/0255 701/103 |
| 2019/0093536 A1* | 3/2019 | Nakano | F01N 3/106 |
| 2020/0056526 A1* | 2/2020 | Tsuboi | F01N 3/0814 |

* cited by examiner

TEMPERATURE ESTIMATION MODULE, CONTROL APPARATUS FOR INTERNAL COMBUSTION ENGINE, AND METHOD FOR OPERATING TEMPERATURE ESTIMATION MODULE

BACKGROUND

The present invention relates to a temperature estimation module and a control apparatus for an internal combustion engine including the temperature estimation module. The present invention also relates to a method for operating a temperature estimation module.

For example, Japanese Laid-Open Patent Publication No. 2004-218541 discloses a control apparatus that executes dither control in which, if there is a request to increase the temperature of a catalytic device (an exhaust purifying device), some of a plurality of cylinders are set as a rich combustion cylinder having an air-fuel ratio that is richer than a theoretical air-fuel ratio, whereas the remaining cylinders are set as a lean combustion cylinder having an air-fuel ratio that is leaner than the theoretical air-fuel ratio.

During execution of the dither control described above, the actual temperature of the exhaust purifying device, that is, the temperature reflecting the temperature increase effect produced by the dither control, may be estimated to monitor the temperature of the exhaust purifying device that is increased in temperature. However, during the execution of dither control, there is a case in which it is preferable to determine whether to execute or stop various processes based on a temperature of the exhaust purifying device that would be obtained if dither control was not executed. In other words, there is a case in which it is inappropriate to determine whether to execute or stop various processes based on only estimated actual temperatures.

SUMMARY

Aspects of the present invention and the advantages are as follows.

1. A temperature estimation module is applied to a control apparatus for an internal combustion engine. The internal combustion engine includes an exhaust purifying device configured to purify an exhaust gas discharged from a plurality of cylinders and a plurality of fuel injection valves respectively arranged at the plurality of cylinders. The control apparatus is configured to execute a dither control process that operates the fuel injection valves so that at least one of the plurality of cylinders is a lean combustion cylinder in which an air-fuel ratio is leaner than a theoretical air-fuel ratio and so that at least a further one of the plurality of cylinders is a rich combustion cylinder in which an air-fuel ratio is richer than the theoretical air-fuel ratio. The temperature estimation module is configured to execute a virtual temperature estimation process and an actual temperature estimation process. The virtual temperature estimation process estimates a virtual temperature, which is a temperature of the exhaust purifying device under an assumption that the dither control process is not executed, based on an operation point of the internal combustion engine during execution of the dither control process. The actual temperature estimation process estimates an actual temperature of the exhaust purifying device based on a difference between the air-fuel ratio of the rich combustion cylinder and the air-fuel ratio of the lean combustion cylinder and based on the operation point of the internal combustion engine during execution of the dither control process.

In a method for operating a temperature estimation module applied to a control apparatus for an internal combustion engine, the internal combustion engine includes an exhaust purifying device configured to purify an exhaust gas discharged from a plurality of cylinders and a plurality of fuel injection valves respectively arranged at the plurality of cylinders. The control apparatus is configured to execute a dither control process that operates the fuel injection valves so that at least one of the plurality of cylinders is a lean combustion cylinder in which an air-fuel ratio is leaner than a theoretical air-fuel ratio and so that at least a further one of the plurality of cylinders is a rich combustion cylinder in which an air-fuel ratio is richer than the theoretical air-fuel ratio. The method includes estimating a virtual temperature, which is a temperature of the exhaust purifying device under an assumption that the dither control process is not executed, based on an operation point of the internal combustion engine during execution of the dither control process and estimating an actual temperature of the exhaust purifying device based on a difference between the air-fuel ratio of the rich combustion cylinder and the air-fuel ratio of the lean combustion cylinder and based on the operation point of the internal combustion engine during execution of the dither control process.

In the above configurations, the temperature estimation module estimates not only the actual temperature of the exhaust purifying device but also the virtual temperature in consideration of the fact that the temperature of the exhaust purifying device is determined in accordance with the operation point of the internal combustion engine when dither control is not executed. Thus, the determination of whether to execute or stop the dither control is more appropriate than a case in which only the actual temperature is estimated.

2. A control apparatus for an internal combustion engine includes the temperature estimation module according to the first aspect. The control apparatus is configured to execute a first stop process that stops the dither control process in accordance with a result of a high-low comparison between the virtual temperature and a specified temperature.

In the above configuration, the first stop process is executed in accordance with the high-low comparison between the virtual temperature and the specified temperature. Thus, whether the present running state of the internal combustion engine is appropriate for stopping the dither control process is determined, and the dither control process is stopped.

3. In the control apparatus for an internal combustion engine according to the second aspect, the exhaust purifying device includes a catalyst. The control apparatus is configured to execute a predetermined diagnosis process under a condition that the virtual temperature is determined to be greater than or equal to the specified temperature. The first stop process includes a process that stops the dither control process when the predetermined diagnosis process is executed.

In some cases, a diagnosis process requests that the temperature of the exhaust purifying device be greater than or equal to a specified temperature, for example, so that the catalyst of the exhaust purifying device is in an active state. Additionally, in some cases, a diagnosis process requests that the dither control process be stopped. If whether the condition for executing such a diagnosis process (predetermined diagnosis process) is satisfied is determined based on an estimate of the actual temperature, the dither control process will be stopped when the execution condition of the predetermined diagnosis process is satisfied. This may result in a situation in which the temperature of the exhaust purifying device is less than the specified temperature. In this case, hunting of the execution and stop of the dither control process may occur. In this regard, in the above configuration, whether the execution condition of the predetermined diagnosis process is satisfied is determined based on the virtual temperature. This limits occurrence of hunting.

4. In the control apparatus for an internal combustion engine according to the second aspect, the control apparatus is configured to execute the dither control process for a regeneration process of the exhaust purifying device under a condition that the temperature of the exhaust purifying device is greater than or equal to the specified temperature. The first stop process includes a process that stops the dither control process when the virtual temperature is less than the specified temperature.

In the above configuration, the dither control process is executed for a regeneration process under a condition that the temperature of the exhaust purifying device is greater than or equal to a specified temperature. According to this condition, when the temperature of the exhaust purifying device cannot be increased to a lower limit temperature necessary for the regeneration process even if the dither control process is executed, the execution of the dither control process is restrained by adjusting the specified temperature. After the dither control process is started, if the dither control process is stopped under the condition that the temperature of the exhaust purifying device is less than the above lower limit temperature, it needs to be determined, for example, whether the temperature of the exhaust purifying device is in a process of reaching the lower limit temperature or the lower limit temperature will not be reached even when the dither control process continues to be executed without change. This complicates control. In this regard, in the above configuration, whether to execute the first stop process is determined based on the virtual temperature. This prevents control from being complicated.

Additionally, in the above configuration, when the dither control process is not executed, whether to execute the dither control process is determined based on the temperature of the exhaust purifying device. When the dither control process is executed, whether to stop the dither control process is determined based on the virtual temperature under the assumption that dither control is not executed. Thus, in comparison with a case in which an actual temperature is used during execution of the dither control process, hunting of the execution and stop of the dither control process may be coped with, for example, by using hysteresis in a determination value.

5. In the control apparatus for an internal combustion engine according to the fourth aspect, the actual temperature estimation process includes a process that estimates a normal actual temperature, which is an actual temperature of the exhaust purifying device in a normal state, based on a difference between the air-fuel ratio of the rich combustion cylinder and the air-fuel ratio of the lean combustion cylinder and based on the operation point of the internal combustion engine, and a process that, when a present estimate of the actual temperature is less than the normal actual temperature, has the estimate of the actual temperature converge on the normal actual temperature with a lapse of time.

In the above configuration, the actual temperature changes with the lapse of time even if a difference between the air-fuel ratio of the rich combustion cylinder and the air-fuel ratio of the lean combustion cylinder and the operation point remain the same. Therefore, when the dither control process is stopped under the condition that the actual temperature is less than the lower limit temperature necessary for the regeneration process, whether the actual temperature will further increase in the future needs to be determined. This complicates control. Thus, the use of the virtual temperature in the first stop process particularly has a great advantage.

6. In the control apparatus for an internal combustion engine according to any one of the second to fifth aspects, the control apparatus is configured to execute a second stop process that stops the dither control process when the actual temperature is greater than or equal to a predetermined temperature that is greater than the specified temperature.

When the temperature of the exhaust purifying device is excessively increased as a result of increasing the temperature of the exhaust purifying device by means of the dither control process, it is desirable that the dither control process stop. The use of the actual temperature is appropriate for determining this process. Therefore, in the above configuration, the actual temperature is used in the second stop process.

7. In the control apparatus for an internal combustion engine according to any one of the second to sixth aspects, the internal combustion engine is configured to be mounted on a vehicle. The actual temperature estimation process is a process that estimates the actual temperature to be lower when speed of the vehicle is high than when speed of the vehicle is low. The virtual temperature estimation process is a process that estimates the virtual temperature to be lower when speed of the vehicle is high than when speed of the vehicle is low.

The exhaust temperature and the exhaust flow rate are determined at a certain level by the operation point of the internal combustion engine. This allows for acknowledgement of the temperature of the exhaust purifying device when the dither control process is not executed. When the dither control process is executed, the temperature increase capability is determined in accordance with a difference between the air-fuel ratio of the rich combustion cylinder and the air-fuel ratio of the lean combustion cylinder. Thus, according to the difference and the operation point, the actual temperature of the exhaust purifying device in execution of the dither control process is acknowledged. The actual temperature of the exhaust purifying device and the virtual temperature under the assumption that the dither control process is not executed while the dither control process is executed also depend on the amount of heat dissipation of the exhaust purifying device and thus depend on a vehicle speed. Therefore, for example, when whether or not to execute the first stop process is determined in accordance with the operation point without depending on an estimate of the actual temperature or an estimate of the virtual temperature, which are described above, whether to execute the first stop process may be erroneously determined due to a low accuracy for acknowledging the temperature of the exhaust purifying device. Therefore, the determination that is made based on an estimate of the virtual temperature and an estimate of the actual temperature particularly has a great advantage.

DETAILED DESCRIPTION

One embodiment of a control apparatus for an internal combustion engine will be hereinafter described with reference to the drawings.

Figure 1:
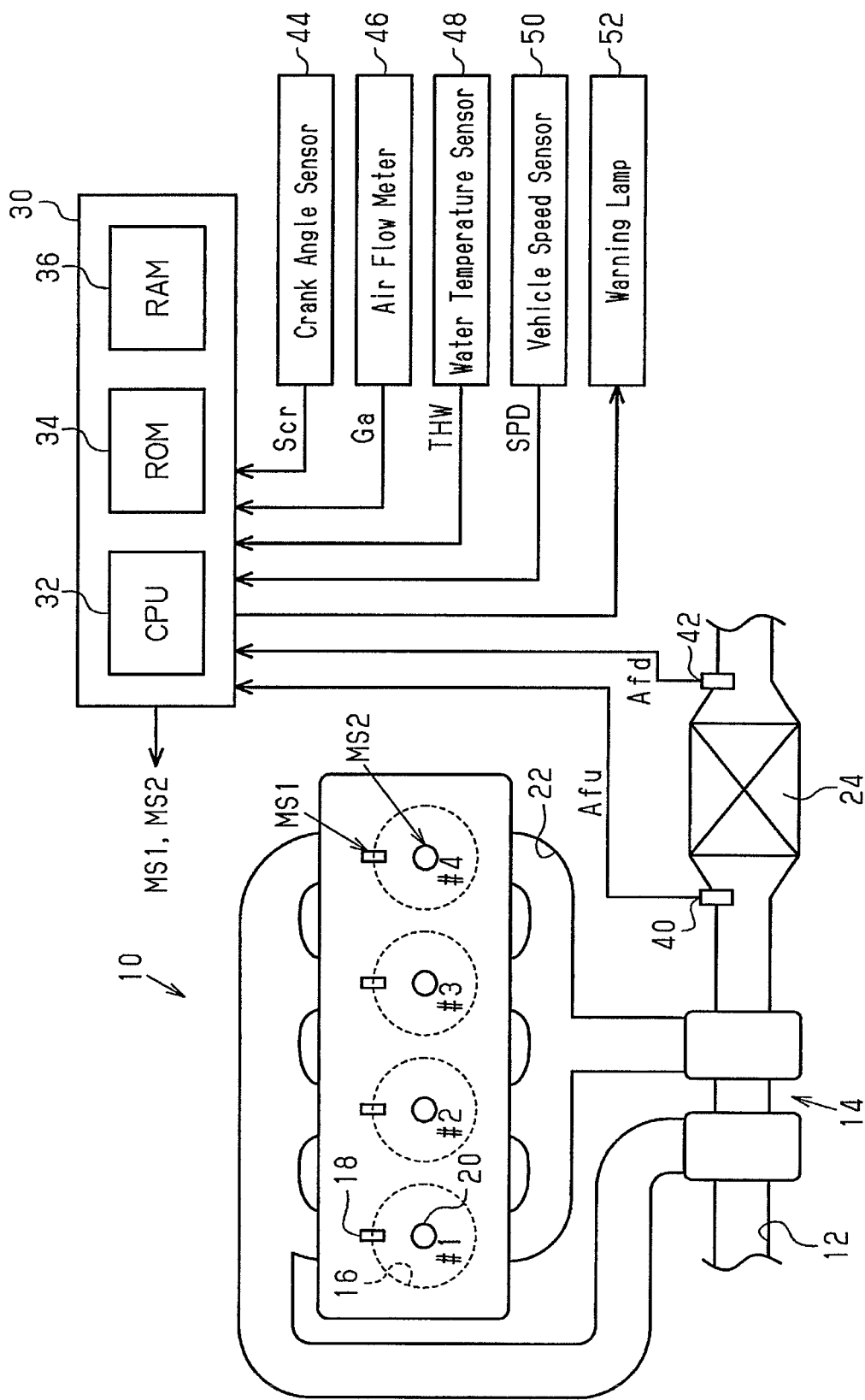
FIG. 1 is a view showing a control apparatus for an internal combustion engine and the internal combustion engine according to one embodiment.

FIG. 1 shows an internal combustion engine 10 that is mounted on a vehicle. In the internal combustion engine 10, air drawn from an intake-air passage 12 flows through a supercharger 14 into each combustion chamber 16 in cylinders #1 to #4. Each of the cylinders #1 to #4 is provided with a fuel injection valve 18 that injects fuel and an ignition device 20 that generates a spark discharge. In the combustion chamber 16, an air-fuel mixture of air and fuel is supplied to be burned, and the burned air-fuel mixture is discharged into an exhaust passage 22 as exhaust gases. A three-way catalyst 24 capable of storing oxygen is arranged in the exhaust passage 22 at the downstream side of the supercharger 14.

A control apparatus 30, which controls the internal combustion engine 10, operates operating portions of the internal combustion engine 10 such as the fuel injection valves 18 and the ignition devices 20 to control the control amounts (torque, exhaust gas components, etc.) of the internal combustion engine 10. At this time, the control apparatus 30 refers to an air-fuel ratio (upstream air-fuel ratio Afu) detected by an air-fuel ratio sensor 40 arranged at the upstream side of the three-way catalyst 24 or an air-fuel ratio (downstream air-fuel ratio Afd) detected by an air-fuel ratio sensor 42 arranged at the downstream side of the three-way catalyst 24. The control apparatus 30 further refers to an output signal Scr of a crank angle sensor 44, an intake air amount Ga detected by an air flow meter 46, the temperature (water temperature THW) of cooling water of the internal combustion engine 10 detected by a water temperature sensor 48, and a vehicle speed SPD detected by a vehicle speed sensor 50. The control apparatus 30 includes a CPU 32, a ROM 34, and a RAM 36 and controls the control amounts described above by allowing the CPU 32 to execute programs stored in the ROM 34.

Figure 2:
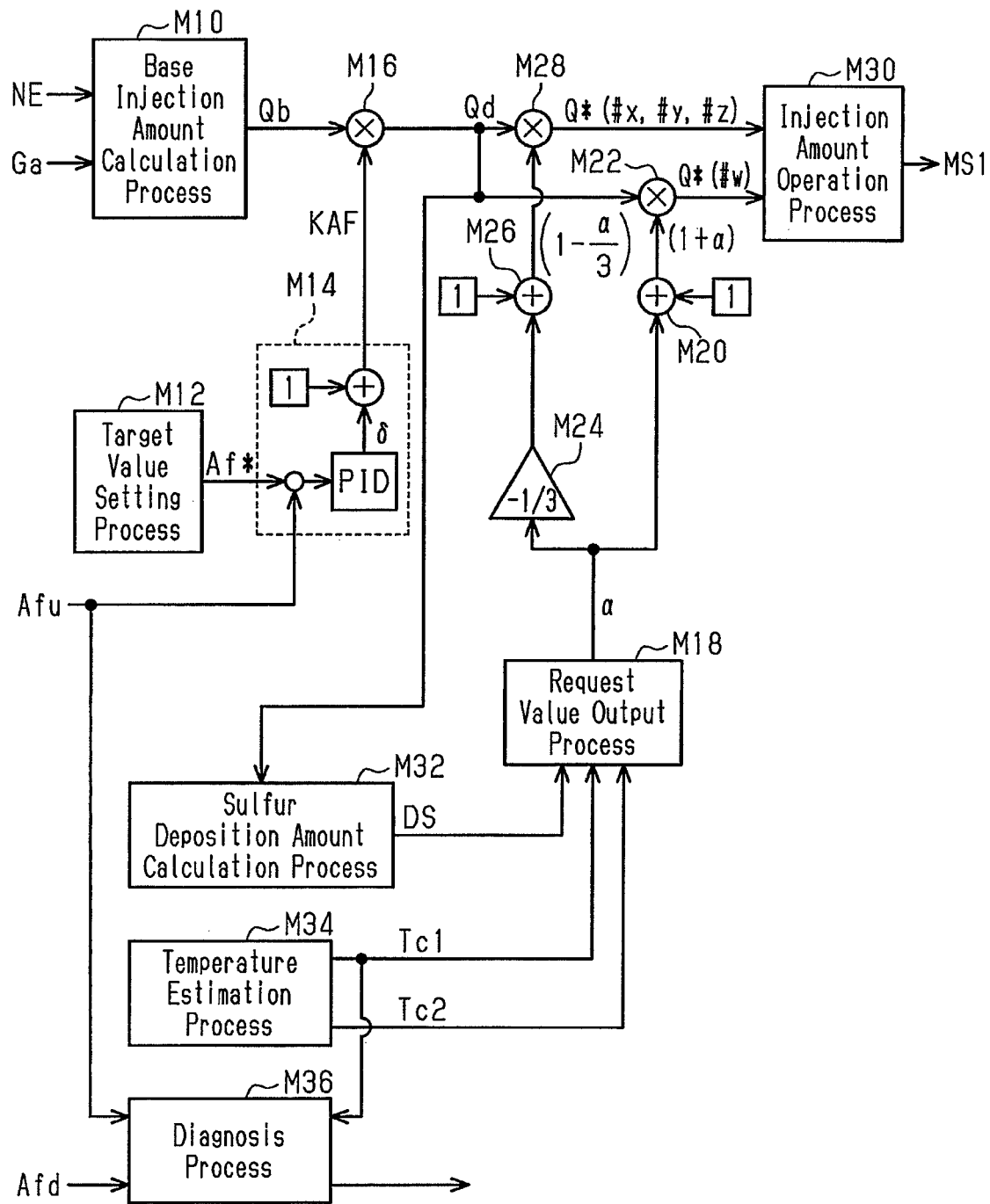
FIG. 2 is a block diagram showing some processes executed by the control apparatus according to the embodiment.

FIG. 2 shows some of the processes realized by the CPU 32 executing a program stored in the ROM 34.

A base injection amount calculation process M10 calculates a base injection amount Qb as an open-loop operation amount, which is an operation amount to adjust the air-fuel ratio of the air-fuel mixture in the combustion chamber 16 to a target air-fuel ratio through open-loop control, based on the intake air amount Ga and a rotation speed NE calculated based on the output signal Scr of the crank angle sensor 44.

A target value setting process M12 sets a target value Af* of a feedback control amount that controls the air-fuel ratio of the air-fuel mixture in the combustion chamber 16 so as to be the target air-fuel ratio described above.

A feedback process M14 calculates a feedback operation amount KAF, which is an operation amount that adjusts the upstream air-fuel ratio Afu, or a feedback control amount, so as to be a target value Af* through feedback control. In the present embodiment, a difference between the target value Af* and the upstream air-fuel ratio Afu is input to each of a proportional element, an integral element, and a differentiating element. An output value of the proportional element, an output value of the integral element, and an output value of the differentiating element are added together to calculate a correction ratio δ of the base injection amount Qb. The feedback operation amount KAF is "1+δ."

A request injection amount calculation process M16 corrects the base injection amount Qb by multiplying the base injection amount Qb by the feedback operation amount KAF to calculate a request injection amount Qd.

A request value output process M18 calculates and outputs an injection amount correction request value α of dither control that varies the air-fuel ratio of an air-fuel mixture supplied for combustion among the cylinders while controlling the injection amount so that the component of the entirety of exhaust gases discharged from the cylinders #1 to #4 of the internal combustion engine 10 is equal to that of a case in which the air-fuel ratio of an air-fuel mixture supplied for combustion in all of the cylinders #1 to #4 is the target air-fuel ratio. The phrase "controlling the injection amount so that the component of the entirety of exhaust gases discharged from the cylinders #1 to #4 of the internal combustion engine 10 is equal to that of a case in which the air-fuel ratio of an air-fuel mixture supplied for combustion in all of the cylinders #1 to #4 is the target air-fuel ratio" means that the injection amount is controlled so that the entirety of exhaust gases discharged from the cylinders #1 to #4 includes unburnt fuel components and oxygen that can react with each other neither too much nor too little. In the dither control according to the present embodiment, one of the first to fourth cylinders #1 to #4 is set as a rich combustion cylinder in which the air-fuel ratio of the air-fuel mixture is richer than a theoretical air-fuel ratio, whereas the remaining three cylinders are set as a lean combustion cylinder in which the air-fuel ratio of the air-fuel mixture is leaner than the theoretical air-fuel ratio. The injection amount in the rich combustion cylinder is set to be "1+α" times greater than the above request injection amount Qd, whereas the injection amount in the lean combustion cylinder is set to be "1−(α/3)" times greater than the request injection amount Qd. According to the setting of the above injection amounts of the lean combustion cylinder and the rich combustion cylinder, if each of the cylinders #1 to #4 is filled with the same amount of air, the component of the entirety of exhaust gases discharged from the cylinders #1 to #4 of the internal combustion engine 10 is equal to that of a case in which the air-fuel ratio of an air-fuel mixture supplied for combustion in all of the cylinders #1 to #4 is the target air-fuel ratio. Additionally, according to the setting of the above injection amounts, if each of the cylinders #1 to #4 is filled with the same amount of air, the inverse of an average value of a fuel-air ratio of an air-fuel mixture supplied for combustion in the cylinders #1 to #4 is the target air-fuel ratio. The fuel-air ratio is an inverse of the air-fuel ratio.

A correction coefficient calculation process M20 adds the injection amount correction request value α to one to calculate a correction coefficient of the request injection amount Qd with respect to a rich combustion cylinder. A dither correction process M22 multiplies the request injection amount Qd by the correction coefficient "1+α" to calculate an injection amount command value Q* of a cylinder # w that is a rich combustion cylinder. Herein, "w" designates any one of "1" to "4."

A multiplication process M24 multiplies the injection amount correction request value by "−⅓." A correction coefficient calculation process M26 adds the output value of the multiplication process M24 to one to calculate a correction coefficient of the request injection amount Qd with respect to a lean combustion cylinder. A dither correction process M28 multiplies the request injection amount Qd by the correction coefficient "1−(α/3)" to calculate the injection amount command value Q* of each of cylinders # x, # y, and # z that are lean combustion cylinders. Herein, "x" or "y" or "z" is any one of "1" to "4," and "w," "x," "y," and "z" differ from each other.

An injection amount operation process M30 generates an operation signal MS1 of the fuel injection valve 18 of the rich combustion cylinder # w based on the injection amount command value Q* output by the dither correction process M22, sends the operation signal MS1 to the fuel injection valve 18, and operates the fuel injection valve 18 so that the amount of fuel injected from the fuel injection valve 18 corresponds to the injection amount command value Q*. Additionally, the injection amount operation process M30 generates an operation signal MS1 of the fuel injection valve 18 of each of the lean combustion cylinders # x, # y, and # z based on the injection amount command value Q* output by the dither correction process M28, sends the operation signal MS1 to the fuel injection valve 18, and operates the fuel injection valve 18 so that the amount of fuel injected from the fuel injection valve 18 corresponds to the injection amount command value Q*.

A sulfur deposition amount calculation process M32 calculates a sulfur deposition amount DS of the three-way catalyst 24 based on the request injection amount Qd. In detail, the sulfur deposition amount calculation process M32 calculates a larger increment ΔDS of the sulfur deposition amount DS when the request injection amount Qd is large than when the request injection amount Qd is small and integrates the increment ΔDS to calculate the sulfur deposition amount DS.

A temperature estimation process M34 calculates a first catalyst temperature Tc1 and a second catalyst temperature Tc2.

Figure 3:
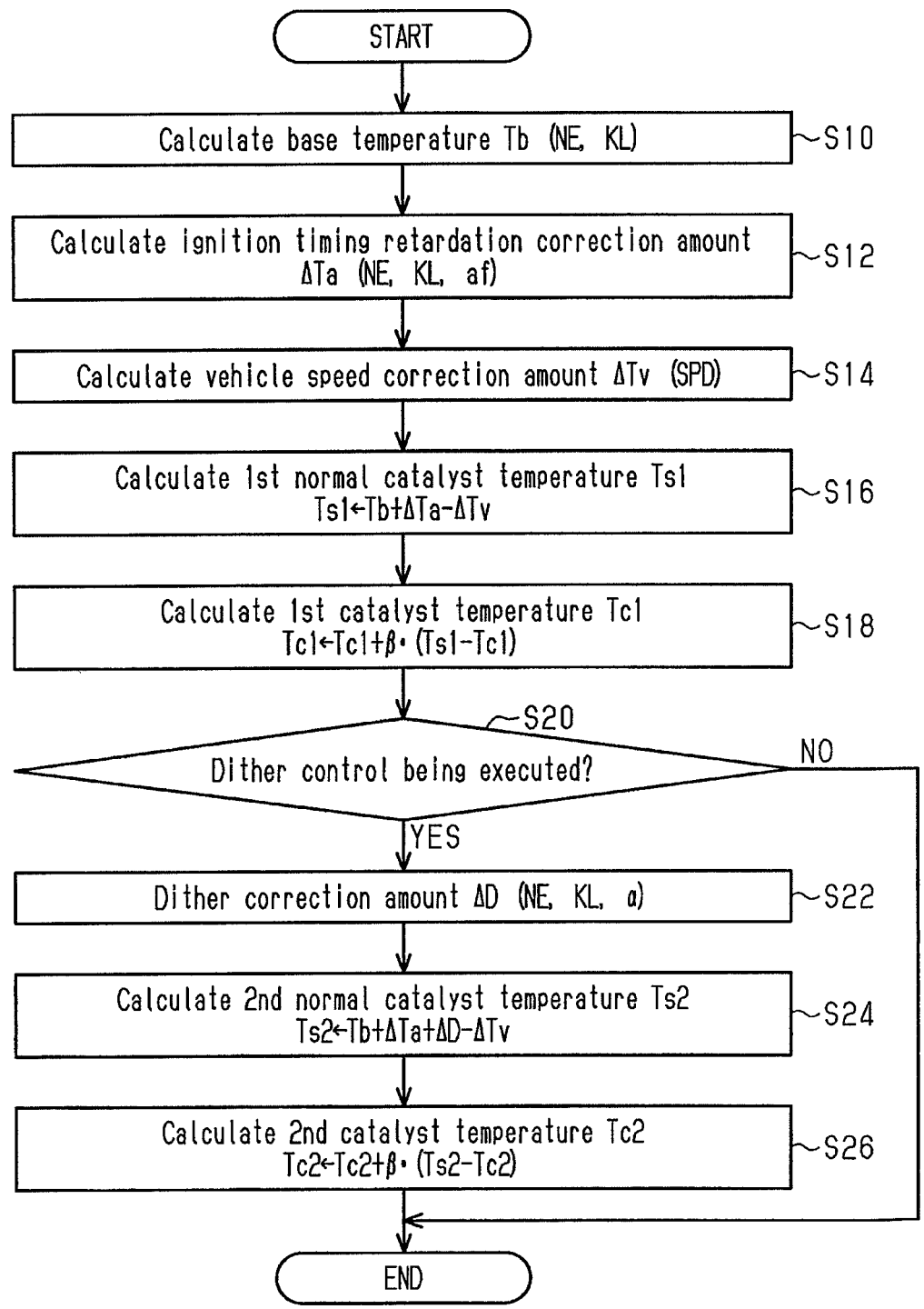
FIG. 3 is a flowchart showing procedures of a temperature estimating process according to the embodiment.

FIG. 3 shows the procedures of the temperature estimation process M34. The process of FIG. 3 is realized by the CPU 32 repeatedly executing a program stored in the ROM 34, for example, in a predetermined cycle. In the following description, the step number is represented by a numeral provided with "S" in front.

In the series of steps in FIG. 3, based on the rotation speed NE and a load factor KL, which are two parameters that determine the operation point of the internal combustion engine 10, the CPU 32 first calculates a base temperature Tb, which is determined in accordance with the operation point (S10). The load factor KL is a parameter that determines the amount of air filling the combustion chamber 16 and is the ratio of an amount of air entering one cylinder per combustion cycle to a reference entrance air amount. The reference entrance air amount may be an amount that is variably set in accordance with the rotation speed NE. When the load factor KL is large, the CPU 32 calculates the base temperature Tb to be a greater value than when the load factor KL is small. Additionally, when the rotation speed NE is high, the CPU 32 calculates the base temperature Tb to be a greater value than when the rotation speed NE is low.

In detail, the ROM 34 beforehand stores map data in which the rotation speed NE and the load factor KL are input variables and the base temperature Tb is an output variable, and the CPU 32 performs a map calculation on the base temperature Tb. The map data is combination data including discrete values of input variables and values of output variables corresponding to the values of the respective input variables. For example, when the value of an input variable conforms to any one of the values of input variables of map data, a map calculation may be performed to find the value of a corresponding output variable of the map data as a calculation result. When the value of an input variable does not conform to any one of the values of input variables of map data, a map calculation may be performed to find a value obtained by interpolating the values of a plurality of output variables included in the map data as a calculation result.

Thereafter, the CPU 32 calculates an ignition timing retardation correction amount ΔTa based on the rotation speed NE, the load factor KL, and a retardation amount af of output timing (ignition timing) at which the ignition device 20 generates a discharge spark from MBT (Minimum advance for the Best Torque) (S12). The ignition timing retardation correction amount ΔTa increasingly corrects the base temperature Tb. In detail, when the retardation amount af is large, the ignition timing retardation correction amount ΔTa corrects the base temperature Tb to a greater value than when the retardation amount af is small. More specifically, the ROM 34 beforehand stores map data in which the rotation speed NE, the load factor KL, and the retardation amount af are input variables and the ignition timing retardation correction amount ΔTa is an output variable, and the CPU 32 performs a map calculation on the ignition timing retardation correction amount ΔTa.

Thereafter, the CPU 32 calculates a vehicle speed correction amount ΔTv, which is used to decreasingly correct the base temperature Tb, based on the vehicle speed SPD (S14). When the vehicle speed SPD is high, the CPU 32 calculates the vehicle speed correction amount ΔTv to be a greater value than when the vehicle speed SPD is low. The CPU 32 uses the vehicle speed correction amount ΔTv to correct the base temperature Tb to a smaller value when the vehicle speed SPD is high than when the vehicle speed SPD is low. In detail, the ROM 34 may beforehand store map data in which the vehicle speed SPD is an input variable and the vehicle speed correction amount ΔTv is an output variable, and the CPU 32 may perform a map calculation on the vehicle speed correction amount ΔTv.

Thereafter, the CPU 32 calculates a first normal catalyst temperature Ts1 of the three-way catalyst 24 in a normal state by increasingly correcting the base temperature Tb by use of the ignition timing retardation correction amount ΔTa and decreasingly correcting the base temperature Tb by use of the vehicle speed correction amount ΔTv (S16). The normal state of the three-way catalyst 24 refers to a state in which parameters such as the rotation speed NE and the load factor KL are stable and generally maintain constant values.

Thereafter, the CPU 32 calculates the first catalyst temperature Tc1 so that the first catalyst temperature Tc1 converges on the first normal catalyst temperature Ts1 (S18). In detail, the CPU 32 calculates the first catalyst temperature Tc1 by means of an exponential moving average process of the first normal catalyst temperature Ts1 and the first catalyst temperature Tc1. More specifically, the CPU 32 substitutes the sum of the first catalyst temperature Tc1 and the product of a coefficient β and a value obtained by subtracting the first catalyst temperature Tc1 from the first normal catalyst temperature Ts1 for the first catalyst, temperature Tc1. The coefficient β is a value smaller than one. The first catalyst temperature Tc1 is an estimate of a temperature under the assumption that dither control is not executed regardless of whether or not dither control is executed. In other words, when dither control is not executed, the first catalyst temperature Tc1 is an estimate of the actual temperature of the three-way catalyst 24. When dither control is executed, the first catalyst temperature Tc1 is an estimate of a hypothetical temperature (virtual temperature) of the three-way catalyst 24 under the assumption that dither control is not executed.

As is apparent from the description of the setting of the base temperature Tb, when the load factor KL is large, the first normal catalyst temperature Ts1 and the first catalyst temperature Tc1 have greater values than when the load factor KL is small. Additionally, when the rotation speed NE is high, the first normal catalyst temperature Ts1 and the first catalyst temperature Tc1 have greater values than when the rotation speed NE is low.

Thereafter, the CPU 32 determines whether dither control is being executed (S20). This process determines whether the injection amount correction request value α is larger than zero. If it is determined that dither control is being executed (S20: YES), the CPU 32 calculates a dither correction amount ΔD that increasingly corrects the base temperature Tb based on the rotation speed NE, the load factor KL, and the injection amount correction request value α (S22). When the injection amount correction request value α is large, the difference between the air-fuel ratio of the rich combustion cylinder and the air-fuel ratio of the lean combustion cylinder is greater than when the injection amount correction request value α is small. This increases the amount of unburnt fuel that is discharged from the rich combustion cylinder and flows into the three-way catalyst 24 and the amount of oxygen that is discharged from the lean combustion cylinder and flows into the three-way catalyst 24. Therefore, when the injection amount correction request value α is large, the CPU 32 calculates the dither correction amount ΔD to a greater value than when the injection amount correction request value α is small. Additionally, in consideration of the fact that when the rotation speed NE is high, the flow rate of exhaust per unit time is greater than when the rotation speed NE is low, the CPU 32 calculates the dither correction amount ΔD to be a greater value. Additionally, when the load factor KL is large, the CPU 32 calculates the dither correction amount ΔD to be a smaller value than when the load factor KL is small.

Thereafter, the CPU 32 calculates a second normal catalyst temperature Ts2 of the three-way catalyst 24 in the normal state by increasingly correcting the base temperature Tb by use of the ignition timing retardation correction amount ΔTa and decreasingly correcting the base temperature Tb by use of the vehicle speed correction amount ΔTv (S24). Thereafter, the CPU 32 calculates the second catalyst temperature Tc2 so that the second catalyst temperature Tc2 converges on the second normal catalyst temperature Ts2 (S26). In detail, the CPU 32 calculates the second catalyst temperature Tc2 by means of an exponential moving average process of the second normal catalyst temperature Ts2 and the second catalyst temperature Tc2. More specifically, the CPU 32 substitutes the sum of the second catalyst temperature Tc2 and the product of the coefficient β and a value obtained by subtracting the second catalyst temperature Tc2 from the second normal catalyst temperature Ts2 for the second catalyst temperature Tc2 (S26). The second catalyst temperature Tc2 is an estimate of the actual temperature of the three-way catalyst 24.

As is apparent from the description of the setting of the base temperature Tb, when the load factor KL is large, the second normal catalyst temperature Ts2 and the second catalyst temperature Tc2 have greater values than when the load factor KL is small. Additionally, when the rotation speed NE is high, the second normal catalyst temperature Ts2 and the second catalyst temperature Tc2 have greater values than when the rotation speed NE is low. Additionally, as is apparent from the setting of the dither correction amount ΔD, when the injection amount correction request value α is large, the second normal catalyst temperature Ts2 and the second catalyst temperature Tc2 have greater values than when the injection amount correction request value α is small.

When the process of S26 is completed or when the negative determination is made in S20, the CPU 32 temporarily ends the series of steps shown in FIG. 3.

As shown in FIG. 2, the first catalyst temperature Tc1 and the second catalyst temperature Tc2 are input to the above request value output process M18, and the first catalyst temperature Tc1 is input to the diagnosis process M36.

Figure 4:
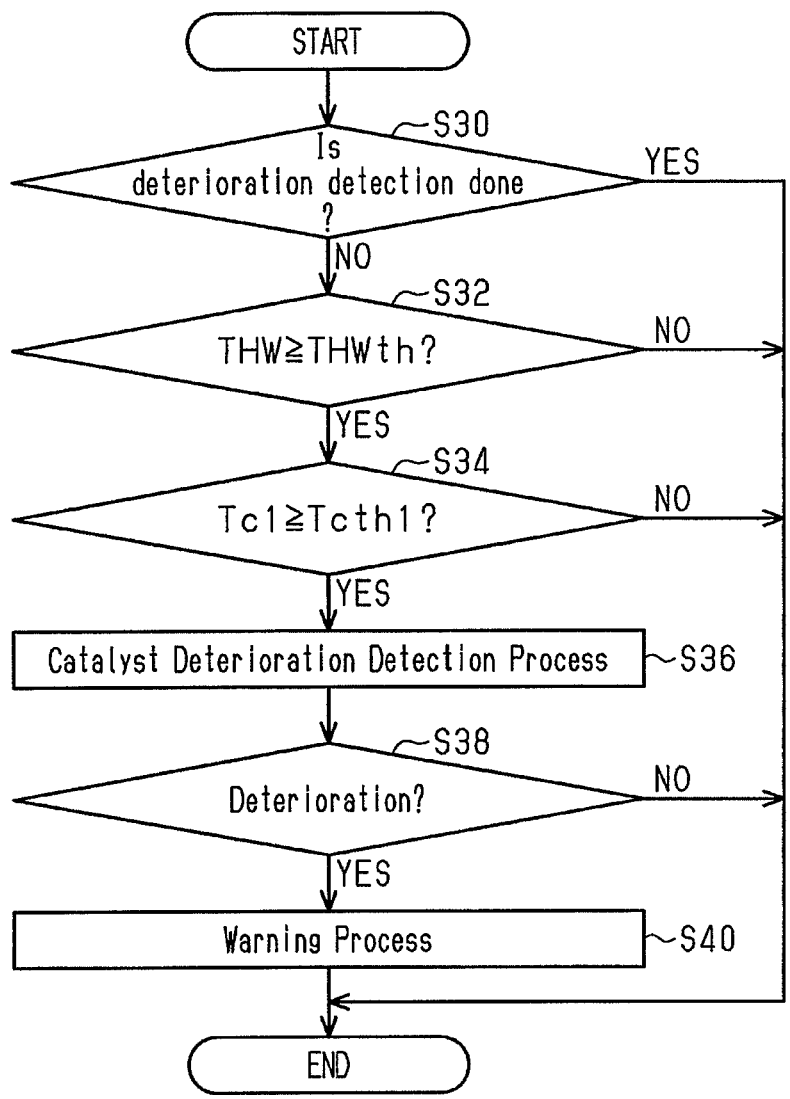
FIG. 4 is a flowchart showing procedures of a diagnosis process according to the embodiment.

FIG. 4 shows the procedures of the diagnosis process M36. The process of FIG. 4 is realized by the CPU 32 repeatedly executing a program stored in the ROM 34, for example, in a predetermined cycle.

In the series of steps in FIG. 4, the CPU 32 first determines whether a deterioration detection process of the three-way catalyst 24 has been executed after a main switch, which is a switch allowing driving of a prime mover that generates propulsion force of the vehicle, is switched from an off state to an on state (S30). The vehicle main switch corresponds to an ignition switch, for example, in a case in which the prime mover is solely the internal combustion engine 10. If it is determined that the deterioration detection process of the three-way catalyst 24 has not been executed (S30: NO), the CPU 32 determines whether the water temperature THW is greater than or equal to a threshold value THWth (S32). Thereafter, if it is determined that the water temperature THW is greater than or equal to the threshold value THWth (S32: YES), the CPU 32 determines whether the first catalyst temperature Tc1 is greater than or equal to a first temperature Tcth1 (S34). This process determines whether the first catalyst temperature Tc1 is suitable for the deterioration detection process of the three-way catalyst 24. Although the deterioration detection process of the three-way catalyst 24 is executed to detect a decrease in the oxygen storage performance of the three-way catalyst 24, the oxygen storage performance cannot be fulfilled when the temperature of the three-way catalyst 24 is low. Therefore, if the deterioration detection process is executed when the temperature of the three-way catalyst 24 is low, the CPU 32 may erroneously determine that the three-way catalyst 24 has deteriorated. Therefore, the execution condition of the deterioration detection process includes a condition that the first catalyst temperature Tc1 is greater than or equal to the first temperature Tcth1.

If it is determined that the first catalyst temperature Tc1 is greater than or equal to the first temperature Tcth1 (S34: YES), the CPU 32 executes the deterioration detection process (S36). The oxygen storage performance of the three-way catalyst 24 may be acknowledged based on a period of time from a point in time when the state is changed from a rich state in which the target air-fuel ratio is richer than the theoretical air-fuel ratio to a lean state to a point in time when the downstream air-fuel ratio Afd becomes lean. Alternatively, the oxygen storage performance of the three-way catalyst 24 may be acknowledged, for example, based on a period of time from a point in time when the state is changed from the lean state in which the target air-fuel ratio is leaner than the theoretical air-fuel ratio to the rich state to a point in time when the downstream air-fuel ratio Afd becomes rich.

Thereafter, the CPU 32 determines whether the three-way catalyst 24 has deteriorated based on the acknowledged level of the oxygen storage performance (S38). Thereafter, if it is determined that the three-way catalyst 24 has deteriorated (S38: YES), the CPU 32 executes a warning process by operating a warning lamp 52 shown in FIG. 1 to prompt the user to bring the vehicle to a repair shop for repair of the internal combustion engine 10 (S40).

When the process of S40 is completed, when the affirmative determination is made in the process of S30, or when the negative determination is made in the processes of S32, S34, and S38, the CPU 32 temporarily ends the series of steps shown in FIG. 4.

Figure 5:
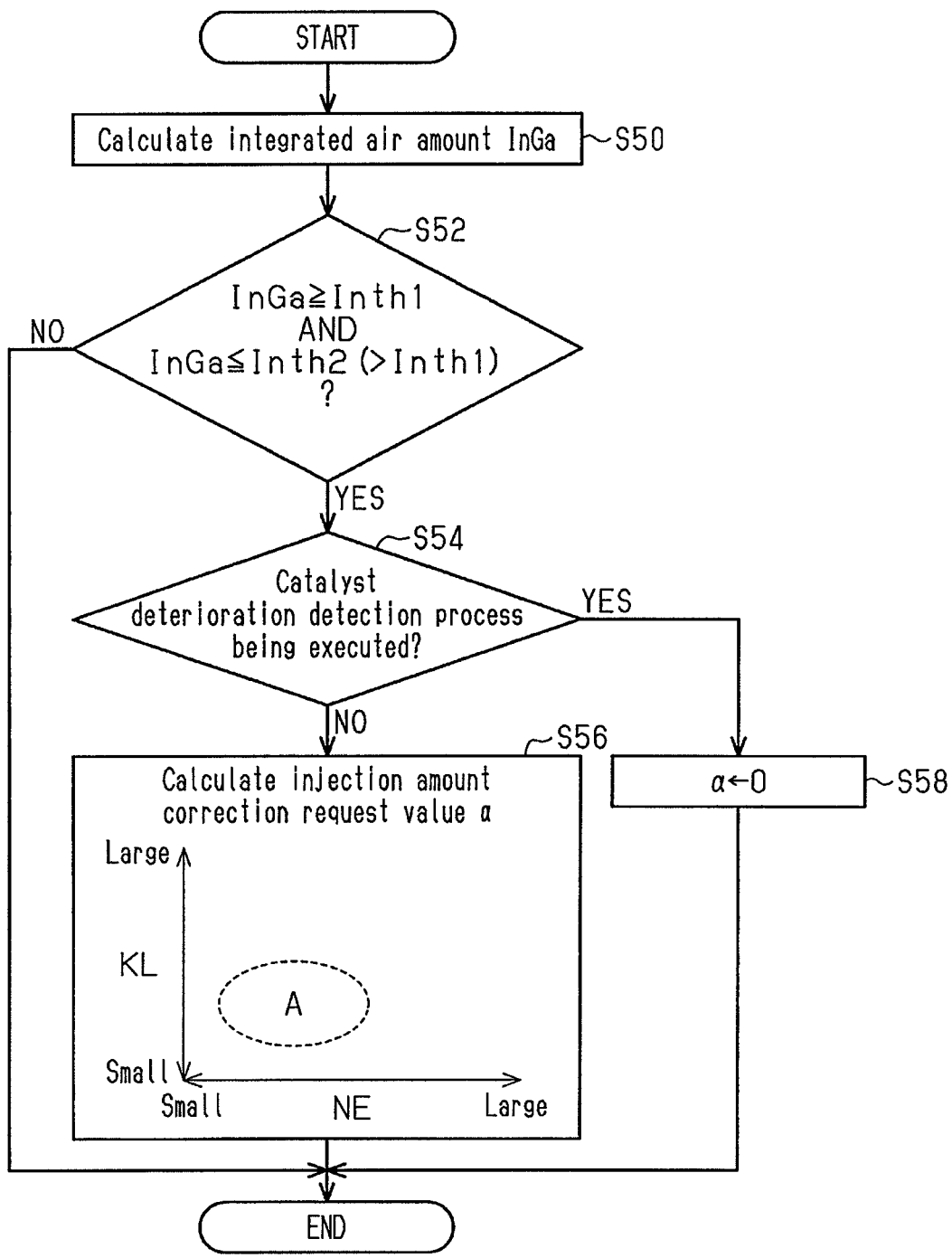
FIG. 5 is a flowchart showing procedures of a request value output process according to the embodiment.

FIG. 5 shows the procedures of a process of the request value output process M18 particularly relative to a warm-up process of the three-way catalyst 24. The process of FIG. 5 is realized by the CPU 32 repeatedly executing a program stored in the ROM 34, for example, in a predetermined cycle.

In the series of steps in FIG. 5, the CPU 32 first calculates an integrated air amount InGa, which is a value obtained by integrating an intake air amount Ga after the main switch is switched from the off state to the on state (S50). Thereafter, the CPU 32 determines whether condition (A) that the integrated air amount InGa is greater than or equal to a first specified value Inth1 and condition (B) that the integrated air amount InGa is less than or equal to a second specified value Inth2 are both true (S52). The second specified value Inth2 is greater than the first specified value Inth1. If condition (A) is true, it is determined that the temperature of an upstream-side end of the three-way catalyst 24 is an active temperature. If condition (B) is true, it is determined that the entirety of the three-way catalyst 24 has not yet reached the active state.

If it is determined that condition (A) and condition (B) are both true (S52: YES), the CPU 32 determines whether the deterioration detection process of the three-way catalyst 24 is being executed (S54). This process determines whether to prohibit dither control. In other words, when dither control is executed, for example, the controllability of exhaust gas components is lowered in comparison with when dither control is not executed. This may lower the accuracy for evaluating the oxygen storage performance of the three-way catalyst 24. Thus, in the present embodiment, the condition for permitting the execution of dither control includes a condition that the catalyst-deterioration detection process is not being executed.

If it is determined that the deterioration detection process is not being executed (S54: NO), the CPU 32 calculates the injection amount correction request value $\alpha$ in accordance with the operation point of the internal combustion engine (S56). If the operation point of the internal combustion engine 10 is not in a region "A" of FIG. 5 where the load is relatively low, the CPU 32 sets the injection amount correction request value $\alpha$ to zero. The reason is that even when dither control is not executed, the exhaust temperature is high at a certain level in regions other than the region "A". If the operation point of the internal combustion engine 10 is in the region "A," the CPU 32 variably sets the injection amount correction request value $\alpha$ to a value greater than zero in accordance with the operation point. For example, in consideration of the fact that when the rotation speed NE is high, the exhaust flow rate per unit time is higher than when the rotation speed NE is low, the injection amount correction request value $\alpha$ may be set to a smaller value. Additionally, for example, in consideration of the fact that when the load factor KL is large, the exhaust flow rate per unit time is higher than when the load factor KL is small, the injection amount correction request value $\alpha$ may be set to a smaller value. In detail, the CPU 32 may beforehand store map data in which the rotation speed NE and the load factor KL are input variables and the injection amount correction request value $\alpha$ is an output variable in the ROM 34 and perform a map calculation on the injection amount correction request value $\alpha$.

If it is determined that the catalyst-deterioration detection process is being executed (S54: YES), the CPU 32 substitutes zero for the injection amount correction request value $\alpha$ (S58).

When the process of S56 and S58 is completed or when the negative determination is made in the process of S52, the CPU 32 temporarily ends the series of steps shown in FIG. 5.

Figure 6:
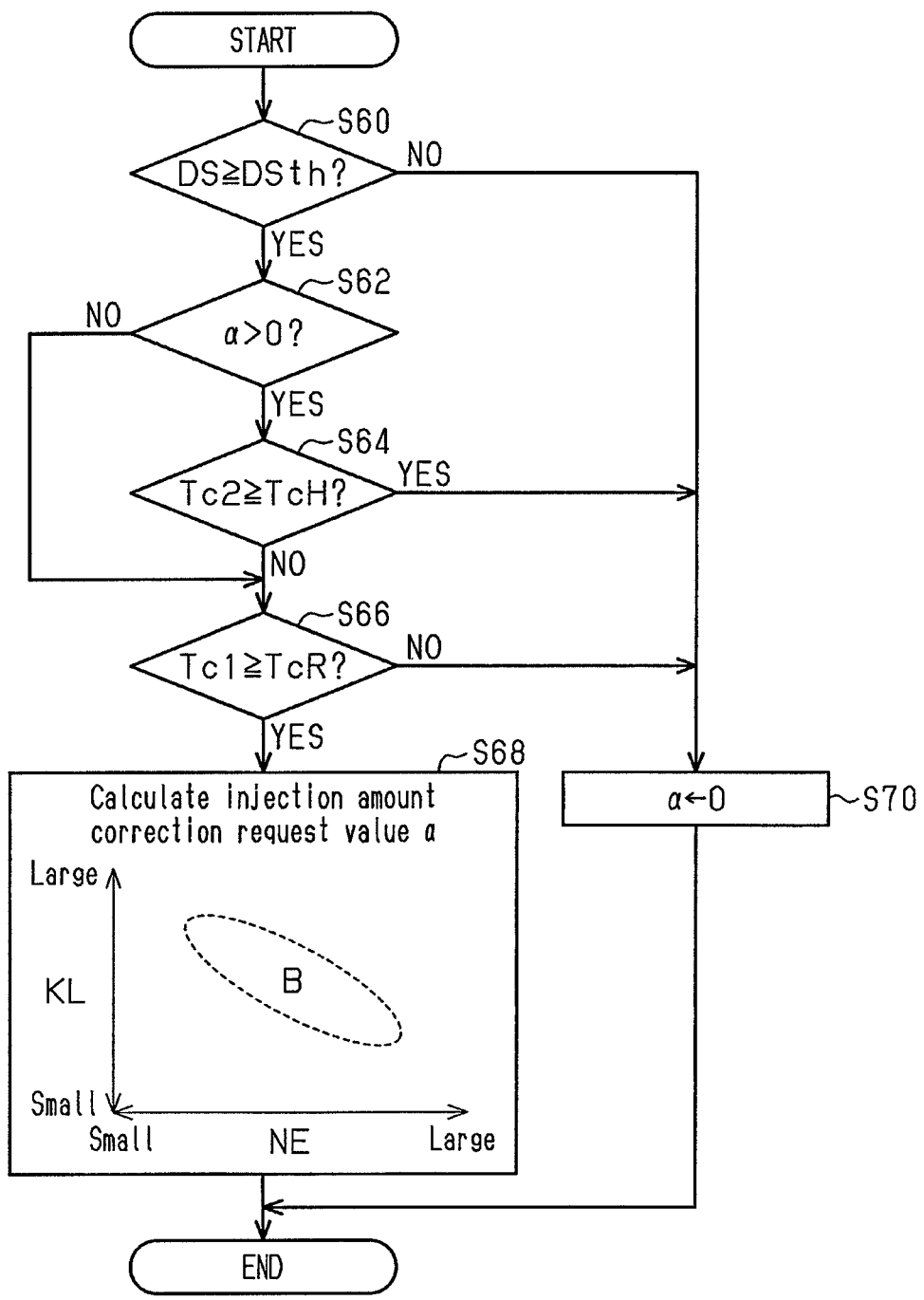
FIG. 6 is a flowchart showing procedures of the request value output process according to the embodiment.

FIG. 6 shows the procedures of a process in the request value output process M18 particularly relative to a sulfur removal process. The process of FIG. 6 is realized by the CPU 32 repeatedly executing a program stored in the ROM 34, for example, in a predetermined cycle.

In the series of steps in FIG. 6, the CPU 32 first determines whether the sulfur deposition amount DS is greater than or equal to a specified amount DSth (S60). If it is determined that the sulfur deposition amount DS is greater than or equal to the specified amount DSth (S60: YES), the CPU 32 determines whether the injection amount correction request value $\alpha$ is greater than zero (S62). If it is determined that the injection amount correction request value $\alpha$ is greater than zero (S62: YES), the CPU 32 determines whether the second catalyst temperature Tc2 is greater than or equal to a predetermined temperature TcH (S64). The predetermined temperature TcH is set to be greater than or equal to an upper limit of a temperature appropriate for the sulfur removal process. This process determines whether the temperature of the three-way catalyst 24 has been excessively increased by dither control.

If it is determined that the second catalyst temperature Tc2 is less than the predetermined temperature TcH (S64: NO) or if the negative determination is made in the process of S62, the CPU 32 determines whether the first catalyst temperature Tc1 is greater than or equal to a reference temperature TcR (S66). The reference temperature TcR is lower than a lower limit of the temperature of the three-way catalyst 24 necessary for executing the sulfur removal process and is assumed to allow the temperature of the three-way catalyst 24 to be greater than or equal to the lower limit when dither control is performed.

If it is determined that the first catalyst temperature Tc1 is greater than or equal to the reference temperature TcR (S66: YES), the CPU 32 calculates the injection amount correction request value $\alpha$ in accordance with the operation point of the internal combustion engine 10 (S68). If the operation point of the internal combustion engine 10 is not in a region B where the load is relatively large, the CPU 32 sets the injection amount correction request value $\alpha$ to zero. In other words, execution of the sulfur removal process in a low load region where the load is lower than that of the region B requires the injection amount correction request value $\alpha$ to be set to a level of a value at which rotation fluctuation of the crankshaft gives a user an uncomfortable feel in order to greatly enhance the temperature increase performance of dither control and thus may not be realistic. If the operation point of the internal combustion engine 10 is in the region B, the CPU 32 variably sets the injection amount correction request value α to a value greater than zero in accordance with the rotation speed NE and the load factor KL. In detail, the CPU 32 may beforehand store map data in which the rotation speed NE and the load factor KL are input variables and the injection amount correction request value α is an output variable in the ROM 34 and perform a map calculation on the injection amount correction request value α.

If the injection amount correction request value α is set to a value greater than zero, this does not mean that the temperature of the three-way catalyst 24 is always greater than or equal to the lower limit of a temperature necessary for executing the sulfur removal process. The reason is that the temperature of the three-way catalyst 24 is not uniquely determined by the operation point of the internal combustion engine 10 and the injection amount correction request value α but changes depending on the vehicle speed SPD, the retardation amount af of ignition timing, and the like. In consideration of all these factors, if the injection amount correction request value α is set so that the temperature of the three-way catalyst 24 is always greater than or equal to the lower limit of the temperature necessary for executing the sulfur removal process when the injection amount correction request value α is a value greater than zero, limitations may be imposed on the setting of the injection amount correction request value α to a value greater than zero. This may lower the frequency of execution of the sulfur removal process. Additionally, if the injection amount correction request value α is greater than zero, the temperature of the three-way catalyst 24 may be increased over the predetermined temperature TcH. This is based on consideration that, for example, if the injection amount correction request value α is set so that the temperature of the three-way catalyst 24 will not exceed the predetermined temperature TcH, dither control may fail to increase the temperature of the three-way catalyst 24 to be greater than or equal to the lower limit of the temperature necessary for executing the sulfur removal process, for example, when the vehicle speed SPD is high.

If the negative determination is made in the process of S60 or S66 or if the affirmative determination is made in the process of S64, the CPU 32 substitutes zero for the injection amount correction request value α (S70).

When the process of S68 or S70 is completed, the CPU 32 temporarily ends the series of steps shown in FIG. 6.

The operation of the present embodiment will now be described with reference to comparative examples of FIGS. 7 and 8.

Figure 7:
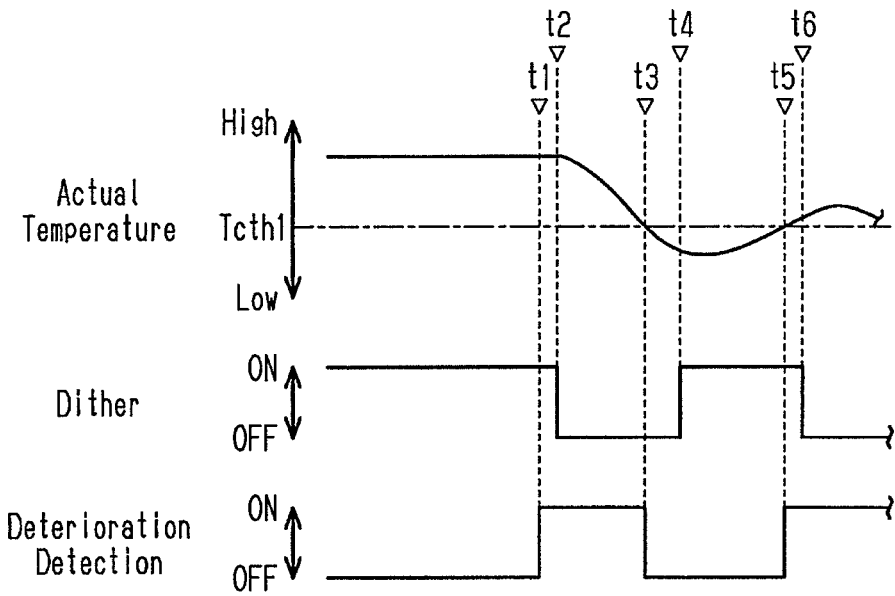
FIG. 7 is a time chart showing a comparative example in relation to a problem that is solved by the embodiment.

FIG. 7 shows the transition of an actual temperature when the deterioration detection process is executed by use of only an estimate of the actual temperature of the three-way catalyst 24, the execution and termination of the dither control, and the execution or termination of the deterioration detection process.

When the deterioration detection process is executed at time t1 as shown in FIG. 7, the dither control is stopped at time t2. In accordance with the stop of the dither control, the actual temperature decreases and falls below the first temperature Tcth1 at time t3. In accordance with the fall of the actual temperature below the first temperature Tcth1, the deterioration detection process is stopped. The dither control is restarted at time t4. Thereafter, when the actual temperature becomes greater than or equal to the first temperature Tcth1 at time t5, the deterioration detection process is executed. The dither control is stopped at time t6.

As described above, if the start or stop of the deterioration detection process and the start or stop of the dither control are determined based on only the actual temperature, consideration is not given to whether the actual temperature of the three-way catalyst 24 is less than the first temperature Tcth1 due to the stopping of the dither control. This may result in occurrence of the hunting of the start and stop of the deterioration detection process or the start and stop of the dither control. In this regard, in the present embodiment, even when the dither control is executed, whether to perform the catalyst deterioration detection is determined based on the first catalyst temperature Tc1, which is a temperature under the assumption that the dither control is not executed. Whether or not to perform the catalyst deterioration detection is determined based on a temperature that is assumed as the temperature of the three-way catalyst 24 when the dither control is stopped. Thus, occurrence of the hunting is limited.

Figure 8:
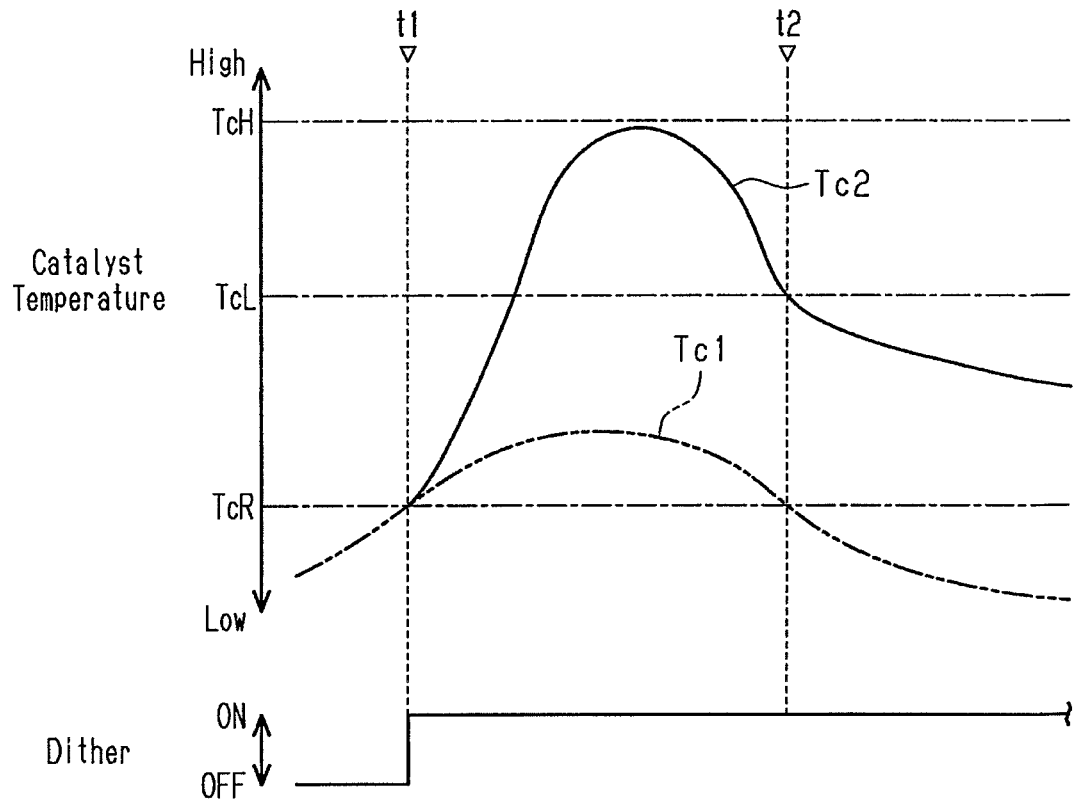
FIG. 8 is a time chart showing a comparative example in relation to a problem that is solved by the embodiment.

FIG. 8 shows the transition of the execution and termination of the dither control when whether or not to execute dither control is determined based on the first catalyst temperature Tc1 and the second catalyst temperature Tc2 of the three-way catalyst 24 that is undergoing the sulfur removal process.

As shown in FIG. 8, when the first catalyst temperature Tc1 exceeds the reference temperature TcR at time t1, dither control is started. The temperature of the three-way catalyst 24 increases when the dither control is started. In other words, the second catalyst temperature Tc2 greatly increases and enters a range between the lower limit temperature TcL and the predetermined temperature TcH for the sulfur removal process. Thereafter, if the operation point reaches a state in which the temperature of exhaust gases does not easily increase or the vehicle speed SPD is increased so that the amount of heat dissipation of the three-way catalyst 24 increases due to a change in the running state of the internal combustion engine 10, the first catalyst temperature Tc1 and the second catalyst temperature Tc2 decrease. At time t2, the first catalyst temperature Tc1 becomes less than the reference temperature TcR, and the second catalyst temperature Tc2 becomes less than the lower limit temperature TcL. However, when whether or not to stop the dither control is determined based on the second catalyst temperature Tc2, it is difficult to immediately stop the dither control when the second catalyst temperature Tc2 indicating an actual temperature has become less than the lower limit temperature TcL. The reason is that even before time t2, there is a period of time during which the second catalyst temperature Tc2 is less than the lower limit temperature TcL during the execution of the dither control. If the dither control cannot be immediately stopped even when the second catalyst temperature Tc2 has become less than the lower limit temperature TcL, the dither control wastefully continues to be executed, increasing fuel consumption.

In this regard, in the present embodiment, when the first catalyst temperature Tc1 is less than the reference temperature TcR during the execution of dither control, the dither control is stopped. As a result, the dither control is prevented from being continuously executed when the temperature of the three-way catalyst 24 cannot be greater than or equal to the lower limit temperature TcL.

According to the present embodiment described above, the following effects can be additionally obtained.

(1) The second catalyst temperature Tc2 is calculated to converge on the second normal catalyst temperature Ts2. In this case, the second catalyst temperature Tc2 is not uniquely determined by, for example, the operation point of the internal combustion engine 10, and changes with the lapse of time. Thus, if dither control is stopped under the condition that the second catalyst temperature Tc2 is less than the lower limit temperature TcL, it is necessary, for example, to determine whether the actual temperature will further rise in the future. This complicates the control. Therefore, the determination of whether to stop dither control based on the first catalyst temperature Tc1 particularly has a great advantage.

(2) The temperature of the three-way catalyst 24 is not fixed by only the operation point of the internal combustion engine 10 and depends on the vehicle speed SPD. Thus, when whether to execute or stop the dither control and whether or not to perform the catalyst deterioration detection are determined in accordance with the operation point of the internal combustion engine 10, it is difficult to increase the determination accuracy. In this regard, in the present embodiment, when the vehicle speed SPD is high, the first catalyst temperature Tc1 and the second catalyst temperature Tc2 are calculated to be smaller values than when the vehicle speed SPD is low. Based on these calculation results, whether to execute or stop the dither control and whether or not to perform the catalyst deterioration detection are determined. Thus, the determinations are performed with high accuracy.

Correspondence Relationship

A correspondence relationship between matters described in the above embodiment and matters described in the section "SUMMARY" is as follows. The following correspondence relationship is described for each number of the solving means described in the section "SUMMARY."

[1] The exhaust purifying device corresponds to the three-way catalyst 24. The dither control process corresponds to the correction coefficient calculation process M20, the dither correction process M22, the multiplication process M24, the correction coefficient calculation process M26, the dither correction process M28, and the injection amount operation process M30 when the injection amount correction request value α is greater than zero. The virtual temperature estimation process corresponds to steps S10 to S18 when dither control is executed. The actual temperature estimation process corresponds to steps S10 to S14 and S22 to S26 when dither control is executed. The temperature estimation module corresponds to the ROM 34 and the CPU 32 that realize the temperature estimation process M34.

[2] The first stop process corresponds to the process of S58 when the affirmative determination is made in the process of S54 and/or the process of S70 when the negative determination is made in the process of S66.

[3] The predetermined diagnosis process corresponds to the diagnosis process M36. The first stop process corresponds to the process of S58 when the affirmative determination is made in the process of S54.

[4] The regeneration process corresponds to the sulfur removal process. The first stop process corresponds to the process of S70 when the negative determination is made in the process of S66.

[5] The normal actual temperature corresponds to the second normal catalyst temperature Ts2. The convergence process corresponds to the process of S26.

[6] The second stop process corresponds to the process of S70 when the affirmative determination is made in the process of S64.

[7] The execution of the virtual temperature estimation process and the actual temperature estimation process based on a vehicle speed corresponds to the use of the vehicle speed correction amount ΔTv in the processes of S16 and S24.

OTHER EMBODIMENTS

At least one of the matters of the above embodiment may be modified as follows.

Actual Temperature Estimation Process and Virtual Temperature Estimation Process In the above embodiment, the base temperature Tb is calculated based on two parameters, i.e., the rotation speed NE and the load factor KL. However, the present invention is not limited to this. For example, if there is a possibility that alcohol is mixed with fuel, when the alcohol concentration is high, the base temperature Tb may be calculated to be a greater value than when the alcohol concentration is low by use of, for example, a detection value of an alcohol concentration detected by an alcohol concentration sensor in addition to the above two parameters. Additionally, for example, if the internal combustion engine 10 includes an EGR passage by which the exhaust passage 22 and the intake-air passage 12 are connected together, when the EGR rate is high, the base temperature Tb may be calculated to be a smaller value than when the EGR rate is low based on the above two parameters and an EGR rate obtained by dividing the flow rate of exhaust gases flowing into the intake-air passage 12 from the EGR passage by the intake air amount Ga. Further, the base temperature Tb may be calculated by all of the above four parameters. This can be realized, for example, by beforehand storing map data in which the four parameters are input variables and the base temperature Tb is an output variable in the ROM 34 and by the CPU 32 performing a map calculation on the base temperature Tb. Alternatively, instead of this, the ROM 34 may beforehand store map data in which the rotation speed NE and the load factor KL are input variables and the base value Tb0 is an output variable, map data in which the alcohol concentration is an input variable and the alcohol correction amount is an output variable, and map data in which the EGR rate is an input variable and the EGR correction amount is an output variable. In this case, the CPU 32 may perform a map calculation on the base value, the alcohol correction amount, and the EGR correction amount and correct the base value by use of the alcohol correction amount and the EGR correction amount to calculate the base temperature Tb.

Parameters that determine the operation point of the internal combustion engine 10, which is used to calculate the base temperature Tb, are not limited to the rotation speed NE and the load factor KL. For example, instead of the load factor KL, the base injection amount Qb may be used as a parameter showing a load. Also, for example, an accelerator operation amount may be used. The operation point is not limited to that specified by the rotation speed NE and the load and may be specified by, for example, the intake air amount Ga. The operation point may be specified by, for example, only the load.

In the above embodiment, the first normal catalyst temperature Ts1 is a value obtained by adding the ignition timing retardation correction amount ΔTa to the base temperature Tb and subtracting the vehicle speed correction amount ΔTv. However, the present invention is not limited to this. For example, when supercharging pressure by the supercharger 14 is high, the base temperature Tb may be corrected by use of a correction amount calculated based on a scavenging rate if scavenging in which air that has entered the combustion chamber from the intake-air passage 12 blows toward the exhaust passage 22 occurs in an overlap period between an intake-valve opening period and an exhaust-valve opening period. The scavenging rate refers to a value obtained such that an amount (scavenging amount) by which air that has entered the combustion chamber 16 from the intake-air passage 12 flows out to the exhaust passage 22 without being burned in the combustion chamber 16 in the overlap period is divided by an amount of air burned in the combustion chamber 16. In detail, when the scavenging rate is high, the base temperature Tb may be corrected by increasing more than when the scavenging rate is low. This can be realized, for example, by beforehand storing map data in which the scavenging rate is an input variable and the scavenging correction amount is an output variable in the ROM 34 and by the CPU 32 performing a map calculation on the scavenging correction amount.

In the above embodiment, the ignition timing retardation correction amount ΔTa is variably set based on the rotation speed NE, the load factor KL, and the retardation amount af. However, the present invention is not limited to this. For example, if there is a possibility that alcohol is mixed with fuel, the ignition timing retardation correction amount ΔTa may be variably set based on, for example, a detection value of an alcohol concentration detected by an alcohol concentration sensor.

In the above embodiment, the dither correction amount ΔD is calculated based on the injection amount correction request value α, the rotation speed NE, and the load factor KL. However, the present invention is not limited to this. For example, the dither correction amount ΔD may be calculated from only the injection amount correction request value α. For example, the dither correction amount ΔD may be calculated from only the injection amount correction request value α and the rotation speed NE. For example, the dither correction amount ΔD may be calculated from only the injection amount correction request value α and the load factor KL.

For example, the processes of S16 to S20 may be excluded from the process of FIG. 3. In detail, the dither correction amount ΔD may be set to zero if the injection amount correction request value α is zero, and an estimate of the actual temperature of the three-way catalyst 24 may be always calculated by the process of S26.

In the above embodiment, the processes of S10 to S14 are shared between the calculation process of the second normal catalyst temperature Ts2 and the calculation process of the first normal catalyst temperature Ts1. However, the present invention is not limited to this. Only in a case in which dither control is executed, a simple process may be used to estimate a virtual temperature under the assumption that dither control is not executed. In other words, for example, only in a case in which dither control is executed, the virtual temperature may be estimated based on a value obtained by subtracting the vehicle speed correction amount ΔTv from the base temperature Tb or the virtual temperature may be estimated based on the base temperature Tb.

Process for Converging on Normal Value (e.g., Normal Actual Temperature)

The coefficient β in the processes of S18 and S26 may be variably set in accordance with the intake air amount Ga or the alcohol concentration. Additionally, an exponential moving average process value does not have to be used as in the processes of S18 and S26. For example, a first-order lag filter, a second-order lag filter, or the like may be used.

Temperature Estimation Subject

For example, if the internal combustion engine 10 includes a gasoline particulate filter (GPF) as described below in the section "Exhaust Purifying Device," the temperature of the GPF may be estimated. This can be performed in the same manner described above.

Use of Actual Temperature

In the above embodiment, the second catalyst temperature Tc2, that is, the actual temperature, is used only for the sulfur removal process during the execution of dither control. However, the present invention is not limited to this. The second catalyst temperature Tc2 may be monitored in, for example, the warm-up process of the three-way catalyst 24. In this case, for example, if the second catalyst temperature Tc2 is increased to a certain level, a process for stopping the dither control process may be executed. Additionally, for example, when the second catalyst temperature Tc2 is increased to a certain level, the injection amount correction request value α may be set to a smaller value than when the second catalyst temperature Tc2 is low.

Predetermined Diagnosis Process

In the above embodiment, the deterioration detection process of the three-way catalyst 24 is shown as an example of the predetermined diagnosis process. However, the present invention is not limited to this. For example, the predetermined diagnosis process may be an abnormal diagnosis process of the air-fuel ratio sensor 40. The abnormal diagnosis process of the air-fuel ratio sensor 40 may include a process for executing an active air-fuel-ratio control in which the target air-fuel ratio is changed from a rich state to a lean state or from a lean state to a rich state with dither control stopped and a diagnostic process for determining whether or not an abnormality of the air-fuel ratio sensor 40 is present based on a change in the upstream air-fuel ratio Afu detected by the air-fuel ratio sensor 40 during the execution of active air-fuel-ratio control. In this case, the three-way catalyst 24 that is in the active state and capable of storing oxygen is effective in keeping components of exhaust gases at the downstream side of the three-way catalyst 24 from worsening in accordance with execution of the diagnostic process. Therefore, it is preferable to execute the abnormal diagnosis process of the air-fuel ratio sensor 40 under a condition that the temperature of the three-way catalyst 24 is greater than or equal to a specified temperature.

Specified Temperature Used in Regeneration Process Execution Condition

In the above embodiment, the temperature that is used as a reference to determine whether or not to permit dither control when dither control is not executed and the temperature that is used as a reference to determine whether or not to stop dither control when dither control is executed are the same reference temperature TcR. However, the present invention is not limited to such a configuration. For example, the temperature for stopping dither control when dither control is executed may be set to be lower than the temperature for permitting dither control when dither control is not executed. This limits occurrence of the hunting of the execution and stop of dither control. The setting for limiting occurrence of hunting is realized by using the first catalyst temperature Tc1 to determine whether or not to execute dither control regardless of whether dither control is executed or not.

Regeneration Process

The regeneration process is not limited to the sulfur removal process. For example, when the internal combustion engine 10 includes a GPF as in the section "Exhaust Purifying Device" described below, the regeneration process may be a process that burns and removes particulate materials when the amount of particulate materials collected by the GPF has exceeded a specified amount.

Dither Control Process

In the above embodiment, the injection amount correction request value α is calculated from two parameters, i.e., the rotation speed NE and the load factor KL. However, the present invention is not limited to this. The injection amount correction request value α may be calculated based on, for example, the water temperature THW in addition to the rotation speed NE and the load factor KL. Further, the injection amount correction request value α is not necessarily required to be calculated based on the rotation speed NE and the load factor KL. For example, the injection amount correction request value α may be variably set based on only at least one of three parameters, i.e., the water temperature THW, the rotation speed NE, and the load factor KL. Additionally, for example, instead of using the rotation speed NE and the load factor KL each of which serves as a parameter that specifies the operation point of the internal combustion engine 10, for example, the accelerator operation amount, instead of the load factor KL, may be used as a parameter showing a load. Additionally, the injection amount correction request value α may be variably set based on the intake air amount Ga instead of the rotation speed NE and the load.

In the execution region of dither control, the injection amount correction request value α does not necessarily have to be variably set to a value larger than zero based on the operation point of the internal combustion engine. For example, a single value of the injection amount correction request value α greater than zero for the warm-up process and a single value of the injection amount correction request value α greater than zero for the sulfur removal process may be determined.

In the above embodiment, the number of lean combustion cylinders is greater than the number of rich combustion cylinders. However, the present invention is not limited to this. For example, the number of rich combustion cylinders and the number of lean combustion cylinders may be equal to each other. Additionally, for example, all cylinders #1 to #4 are not limited so as to be used as a lean combustion cylinder or a rich combustion cylinder. For example, the air-fuel ratio of a cylinder may be set to the target air-fuel ratio. If the amount of air filled in the cylinders is the same in a combustion cycle, the inverse of an average value of a fuel-air ratio does not necessarily have to be a target air-fuel ratio. For example, in a case in which four cylinders are provided as in the above embodiment, the target air-fuel ratio may be set to the inverse of an average value of a fuel-air ratio in five strokes if the amount of air filled in the cylinders is the same. Alternatively, the target air-fuel ratio may be set to the inverse of an average value of a fuel-air ratio in three strokes. In this case, it is preferred that a period during which both a rich combustion cylinder and a lean combustion cylinder exist in a single combustion cycle be generated one time or more in at least two combustion cycles. In other words, if the amount of air filled in the cylinders is the same during a predetermined period, it is preferred that the predetermined period be set to two combustion cycles or less when the target air-fuel ratio is set to the inverse of an average value of a fuel-air ratio. Herein, under the condition that the predetermined period is two combustion cycles, in a case in which a rich combustion cylinder exists only one time during two combustion cycles, the order of appearance of a rich combustion cylinder and a lean combustion cylinder is expressed as, for example, "R, L, L, L, L, L, L, L" where R denotes a rich combustion cylinder, and L denotes a lean combustion cylinder. In this case, the order "R, L, L, L" appears in the period of one combustion cycle, which is shorter than the predetermined period. Thus, at least one of the cylinders #1 to #4 is a lean combustion cylinder, and at least a further one of the cylinders is a rich combustion cylinder. If the target air-fuel ratio is set to the inverse of an average value of a fuel-air ratio obtained in a period differing from one combustion cycle, it is desirable that the amount of air that is temporarily drawn by the internal combustion engine in an air intake step and then returns to the intake air passage before the intake valve is closed can be neglected.

Exhaust Purifying Device

In the above configuration, the three-way catalyst 24 is shown as an example of the exhaust purifying device. However, the present invention is not limited to this. For example, the internal combustion engine 10 may include a gasoline particulate filter (GPF) at the downstream side of the three-way catalyst 24. Additionally, for example, the internal combustion engine 10 may include only the GPF. In that case, it is preferred that the GPF be capable of storing oxygen in order to enhance the temperature increase effect of dither control.

Temperature Increase Request of Exhaust Gases

The temperature increase request is not limited to the request described in the above embodiment. For example, if the internal combustion engine 10 includes the GPF as described in the section "Exhaust Purifying Device," the temperature increase request may be a request to increase the temperature of the GPF in order to burn particulate materials collected by the GPF. If the GPF is arranged at the downstream side of the three-way catalyst 24, the temperature of the GPF may be increased by allowing unburnt fuel discharged from a rich combustion cylinder and oxygen discharged from a lean combustion cylinder to react with each other in the three-way catalyst 24 and by increasing the exhaust gas temperature on the downstream side of the three-way catalyst 24 by means of its reaction heat. Additionally, for example, in order to limit collection of condensed water on the exhaust passage 22, a request to increase the temperature of exhaust gases by dither control may be generated so that the temperature of the exhaust passage 22 increases.

Control Apparatus

The control apparatus is not limited to an apparatus that includes the CPU 32 and the ROM 34 and executes software processes. For example, a dedicated hardware circuit (such as ASIC) that processes at least part of the software processes executed in the above embodiment may be provided. In other words, it is only necessary for the control apparatus to have any one of the following configurations (a) to (c). (a) The control apparatus includes a processing apparatus that executes all of the above processes in accordance with programs and a program-storing device, such as a ROM, that stores programs. (b) The control apparatus includes a processing apparatus that executes part of the above processes in accordance with programs, a program-storing device, and a dedicated hardware circuit that executes the remaining processes. (c) The control apparatus includes a dedicated hardware circuit that executes all of the above processes. Herein, a software processing circuit including the processing apparatus and the program-storing device or a dedicated hardware circuit may be plural in number. In other words, the above processes only need to be executed by processing circuitry that includes at least one of a single or plurality of software processing circuits or a single or plurality of dedicated hardware circuits. The program-storing device, that is, a computer readable medium, includes all available media that can be accessed by a general-purpose or dedicated computer.

Temperature Estimation Module

In the above embodiment, the temperature estimation module is realized by the CPU 32 and the ROM 34 configuring the control apparatus. However, the present invention is not limited to this. The control apparatus may include, for example, two sets of CPUs and ROMs, and the CPU and the ROM in one of the two sets may be used as a dedicated temperature estimation module. Further, the temperature estimation module does not necessarily have to be realized by means of a CPU and a ROM and may be realized by, for example, a dedicated hardware circuit.

Internal Combustion Engine

The internal combustion engine is not limited to a four-cylinder internal combustion engine. For example, a straight-six internal combustion engine may be used. For example, the internal combustion engine may be an internal combustion engine that includes a first exhaust purifying device and a second exhaust purifying device such as a V-type internal combustion engine. The first exhaust purifying device and the second exhaust purifying device purify exhaust gases of different cylinders.

Others

The fuel injection valve is not limited to a fuel injection valve that injects fuel to the combustion chamber 16. For example, a fuel injection valve that injects fuel to the intake-air passage 12 may be used. Air-fuel-ratio feedback control does not necessarily have to be executed when dither control is executed.

Therefore, the present examples and embodiments are to be considered as illustrative and not restrictive and the invention is not to be limited to the details given herein, but may be modified within the scope and equivalence of the appended claims.

The invention claimed is:

1. A temperature estimation module applied to a control apparatus for an internal combustion engine, wherein the internal combustion engine includes an exhaust purifying device configured to purify an exhaust gas discharged from a plurality of cylinders and a plurality of fuel injection valves respectively arranged at the plurality of cylinders, and the control apparatus is configured to execute a dither control process that operates the fuel injection valves so that at least one of the plurality of cylinders is a lean combustion cylinder in which an air-fuel ratio is leaner than a theoretical air-fuel ratio and so that at least a further one of the plurality of cylinders is a rich combustion cylinder in which an air-fuel ratio is richer than the theoretical air-fuel ratio, wherein the temperature estimation module is configured to execute a virtual temperature estimation process that estimates a virtual temperature, which is a temperature of the exhaust purifying device under an assumption that the dither control process is not executed, based on an operation point of the internal combustion engine during execution of the dither control process, and an actual temperature estimation process that estimates an actual temperature of the exhaust purifying device based on a difference between the air-fuel ratio of the rich combustion cylinder and the air-fuel ratio of the lean combustion cylinder and based on the operation point of the internal combustion engine during execution of the dither control process.

2. A control apparatus for an internal combustion engine, the control apparatus comprising the temperature estimation module according to claim 1, wherein the control apparatus is configured to execute a first stop process that stops the dither control process in accordance with a result of a high-low comparison between the virtual temperature and a specified temperature.

3. The control apparatus for an internal combustion engine according to claim 2, wherein the exhaust purifying device includes a catalyst, the control apparatus is configured to execute a predetermined diagnosis process under a condition that the virtual temperature is determined to be greater than or equal to the specified temperature, and the first stop process includes a process that stops the dither control process when the predetermined diagnosis process is executed.

4. The control apparatus for an internal combustion engine according to claim 2, wherein the control apparatus is configured to execute the dither control process for a regeneration process of the exhaust purifying device under a condition that the temperature of the exhaust purifying device is greater than or equal to the specified temperature, and the first stop process includes a process that stops the dither control process when the virtual temperature is less than the specified temperature.

5. The control apparatus for an internal combustion engine according to claim 4, wherein the actual temperature estimation process includes a process that estimates a normal actual temperature, which is an actual temperature of the exhaust purifying device in a normal state, based on a difference between the air-fuel ratio of the rich combustion cylinder and the air-fuel ratio of the lean combustion cylinder and based on the operation point of the internal combustion engine, and a process that, when a present estimate of the actual temperature is less than the normal actual temperature, has the estimate of the actual temperature converge on the normal actual temperature with a lapse of time.

6. The control apparatus for an internal combustion engine according to claim 2, wherein the control apparatus is configured to execute a second stop process that stops the dither control process when the actual temperature is greater than or equal to a predetermined temperature that is greater than the specified temperature.

7. The control apparatus for an internal combustion engine according to claim 2, wherein the internal combustion engine is configured to be mounted on a vehicle, the actual temperature estimation process is a process that estimates the actual temperature to be lower when speed of the vehicle is high than when speed of the vehicle is low, and the virtual temperature estimation process is a process that estimates the virtual temperature to be lower when speed of the vehicle is high than when speed of the vehicle is low.

8. A method for operating a temperature estimation module applied to a control apparatus for an internal combustion engine, wherein the internal combustion engine includes an exhaust purifying device configured to purify an exhaust gas discharged from a plurality of cylinders and a plurality of fuel injection valves respectively arranged at the plurality of cylinders, and the control apparatus is configured to execute a dither control process that operates the fuel injection valves so that at least one of the plurality of cylinders is a lean combustion cylinder in which an air-fuel ratio is leaner than a theoretical air-fuel ratio and so that at least a further one of the plurality of cylinders is a rich combustion cylinder in which an air-fuel ratio is richer than the theoretical air-fuel ratio, the method comprising:

estimating a virtual temperature, which is a temperature of the exhaust purifying device under an assumption that the dither control process is not executed, based on an operation point of the internal combustion engine during execution of the dither control process; and estimating an actual temperature of the exhaust purifying device based on a difference between the air-fuel ratio of the rich combustion cylinder and the air-fuel ratio of the lean combustion cylinder and based on the operation point of the internal combustion engine during execution of the dither control process.

* * * * *